(12) United States Patent
Rath et al.

(10) Patent No.: US 10,444,746 B2
(45) Date of Patent: Oct. 15, 2019

(54) METHOD FOR MANAGING SUBSYSTEMS OF A PROCESS PLANT USING A DISTRIBUTED CONTROL SYSTEM

(71) Applicant: ABB Schweiz AG, Baden (CH)

(72) Inventors: Anand Rath, Bhubaneswar (IN); Divyasheel Sharma, Mohali (IN)

(73) Assignee: ABB Schweiz AG, Baden (CH)

( * ) Notice: Subject to any disclaimer, the term of this patent is extended or adjusted under 35 U.S.C. 154(b) by 53 days.

(21) Appl. No.: 15/517,127

(22) PCT Filed: Aug. 24, 2015

(86) PCT No.: PCT/IB2015/056393
§ 371 (c)(1),
(2) Date: Apr. 5, 2017

(87) PCT Pub. No.: WO2016/059484
PCT Pub. Date: Apr. 21, 2016

(65) Prior Publication Data
US 2017/0248944 A1  Aug. 31, 2017

(30) Foreign Application Priority Data

Oct. 16, 2014 (IN) .......................... 5167/CHE/2014

(51) Int. Cl.
*G05B 23/02* (2006.01)
*G05B 19/418* (2006.01)
(52) U.S. Cl.
CPC ... *G05B 23/0243* (2013.01); *G05B 19/41885* (2013.01); *G05B 23/0216* (2013.01);
(Continued)

(58) Field of Classification Search
None
See application file for complete search history.

(56) References Cited

U.S. PATENT DOCUMENTS

| 7,184,850 B1 | 2/2007 | Logsdon et al. |
| 2002/0077711 A1* | 6/2002 | Nixon ................. C10G 11/187 700/51 |

(Continued)

OTHER PUBLICATIONS

International Search Report, International Application No. PCT/IB2015/056393, dated Nov. 23, 2015, 3 pages.
(Continued)

*Primary Examiner* — Bernard G Lindsay
(74) *Attorney, Agent, or Firm* — Barnes & Thornburg LLP

(57) ABSTRACT

The invention relates to managing a plurality of subsystems of a process plant. The process plant is controlled using a Distributed Control System (DCS) with a plurality of databases distributed within the process plant, wherein each database comprises information corresponding to at least one subsystem of the plurality of subsystems. The method comprises receiving a query at a human machine interface of the DCS, wherein the query is of a predetermined type and is associated with at least one of an operation and health of a subsystem. The method further comprises identifying at a server of the DCS, a database comprising information corresponding to the subsystem. Furthermore, the method comprises processing the query based on the information corresponding to the subsystem. In addition, the method comprises utilizing the DCS to control the operation of the subsystem by controlling process parameters of the process in one or more subsystems.

7 Claims, 5 Drawing Sheets

(52) U.S. Cl.
CPC .......... *G05B 23/0286* (2013.01); *Y02P 90/18* (2015.11); *Y02P 90/26* (2015.11)

(56) References Cited

U.S. PATENT DOCUMENTS

| | | | |
|---|---|---|---|
| 2003/0078683 A1 | 4/2003 | Hartman et al. | |
| 2010/0228376 A1* | 9/2010 | Stafford ................. | G06Q 10/04 700/110 |
| 2013/0173332 A1* | 7/2013 | Ho ......................... | G06Q 10/06 705/7.27 |
| 2014/0365195 A1* | 12/2014 | Lahiri ................... | G06F 19/702 703/12 |

OTHER PUBLICATIONS

Written Opinion issued in connection International Application No. PCT/IB2015/056393, dated Nov. 23, 2015, 5 pages.

International Preliminary Report on Patentability, International Application No. PCT/IB2015/056393, dated Apr. 18, 2017, 6 pages.

\* cited by examiner

METHOD FOR MANAGING SUBSYSTEMS OF A PROCESS PLANT USING A DISTRIBUTED CONTROL SYSTEM

CROSS-REFERENCE TO RELATED APPLICATIONS

This application is a U.S. national stage of International Application Serial No. PCT/IB2015/056393, filed Aug. 24, 2015, which claims priority to Indian Patent Application No. 5167/CHE/2014, filed Oct. 16, 2014. The entire disclosures of both of the foregoing applications are hereby incorporated by reference.

FIELD OF THE INVENTION

The invention generally relates to managing subsystems of a process plant. More specifically, the invention relates to utilizing a Distributed Control System (DCS) with a plurality of databases distributed within the process plant, for controlling processes in the subsystems.

BACKGROUND OF THE INVENTION

In paper, chemical, petroleum, power, or other process plants, skilled technicians are involved in performing routine diagnostic and maintenance operations. These operations may involve predicting/determining state of subsystems or components thereof. In order to perform such operations, a technician would typically fetch data required for performing the operation from the plant into a local storage (e.g. a remote client). Thereafter, based on the characteristics of the data imported and nature of diagnosis/maintenance, the technician would select, train and apply a model on the data. According to the results, the technician may perform further diagnosis or take action to prevent or control a process(es) to ensure healthy operation of the process plant.

The above approach is restrictive due to dependence on the technician. The efficiency of the method depends largely on the ability of the technician. Owing to the complex nature of data in process plants, there may be a significantly large number of models (or model ensembles) available for analysis of data. Each model or model ensemble(s), may not be readily applicable on a data set to obtain results. Applying such a model or model ensemble(s) may require expertise on various learning and analysis models, and experience of working with a wide variety of model. If the technician fails to accurately select the model and train the model, it is likely that the results of the analysis would be faulty. Further restrictions arise due to the scale/distribution of data generated in a process plant. Accordingly, migrating data within or outside the process plant is a challenge and has disadvantages.

In view of the above, there is a need to have an improved method and system for controlling operations within a process plant.

SUMMARY OF THE INVENTION

An aspect of the invention relates to a method for managing a plurality of subsystems of a process plant by controlling process parameters of a process in the process plant. The process plant can be one of, but not limited to, a paper plant, a chemical plant, a petroleum plant and a power generation plant. In an embodiment, the process plant is a substation. In another embodiment, the process plant comprises a substation.

Each subsystem of the plurality of subsystems comprises at least one of a field device and a process equipment. In accordance with the aspect, the process plant is controlled using a Distributed Control System (DCS). The DCS has a plurality of databases distributed within the process plant. Each database of the plurality of databases comprises information corresponding to at least one subsystem of the plurality of subsystems. The information corresponding to a subsystem of the plurality of subsystems is at least one of a state information, a technical specification information and a measurement information with at least one of a field device and a process equipment of the subsystem.

The method comprises receiving a query at a human machine interface of the DCS, wherein the query is of a predetermined type and is associated with at least one of an operation and health of a subsystem of the plurality of subsystems.

The method further comprises identifying at a server of the DCS, a database of the plurality of databases comprising information corresponding to the subsystem. The database is identified based on the query. Thereafter, the method comprises processing the query at the server based on the information corresponding to the subsystem available on the database.

The query is processed by identifying at least one of a model and a model ensemble, based on the predetermined type of the query and the information corresponding to the subsystem. Here, at least one of the model and the model ensemble is identified from a database of the plurality of databases. Identifying at least one of the model and the model ensemble may comprise generating metadata about the information corresponding to the subsystem in the database.

Thereafter, at least one of the identified model and the identified model ensemble is adapted by utilizing the information corresponding to the subsystem. Subsequently, at least one of the adapted model and the adapted model ensemble is utilized for controlling an operation of the subsystem. Adapting at least one of the identified model and the identified model ensemble may comprise utilizing at least one part of the information corresponding to the subsystem for training and at least one other part of the information corresponding to the subsystem for testing at least one of the model and the model ensemble. Training may comprise a step of evaluation, wherein at least a portion of the at least one part of the information is reserved for the evaluation.

Adapting at least one of the identified model and the identified model ensemble may comprise determining an error in application of at least one of the model and the model ensemble based on the information corresponding to the subsystem.

The method additionally comprises utilizing the DCS to control the operation of the subsystem by controlling process parameters of the process in one or more subsystems of the plurality of subsystems, based on said processing of the query. Here, controlling the operation of a subsystem may comprise at least one of servicing the subsystem and replacing at least one of the field device and the process equipment of the subsystem.

BRIEF DESCRIPTION OF THE DRAWINGS

The subject matter of the invention will be explained in more detail in the following text with reference to exemplary embodiments which are illustrated in the attached drawings, in which.

DETAILED DESCRIPTION

Figure 1:
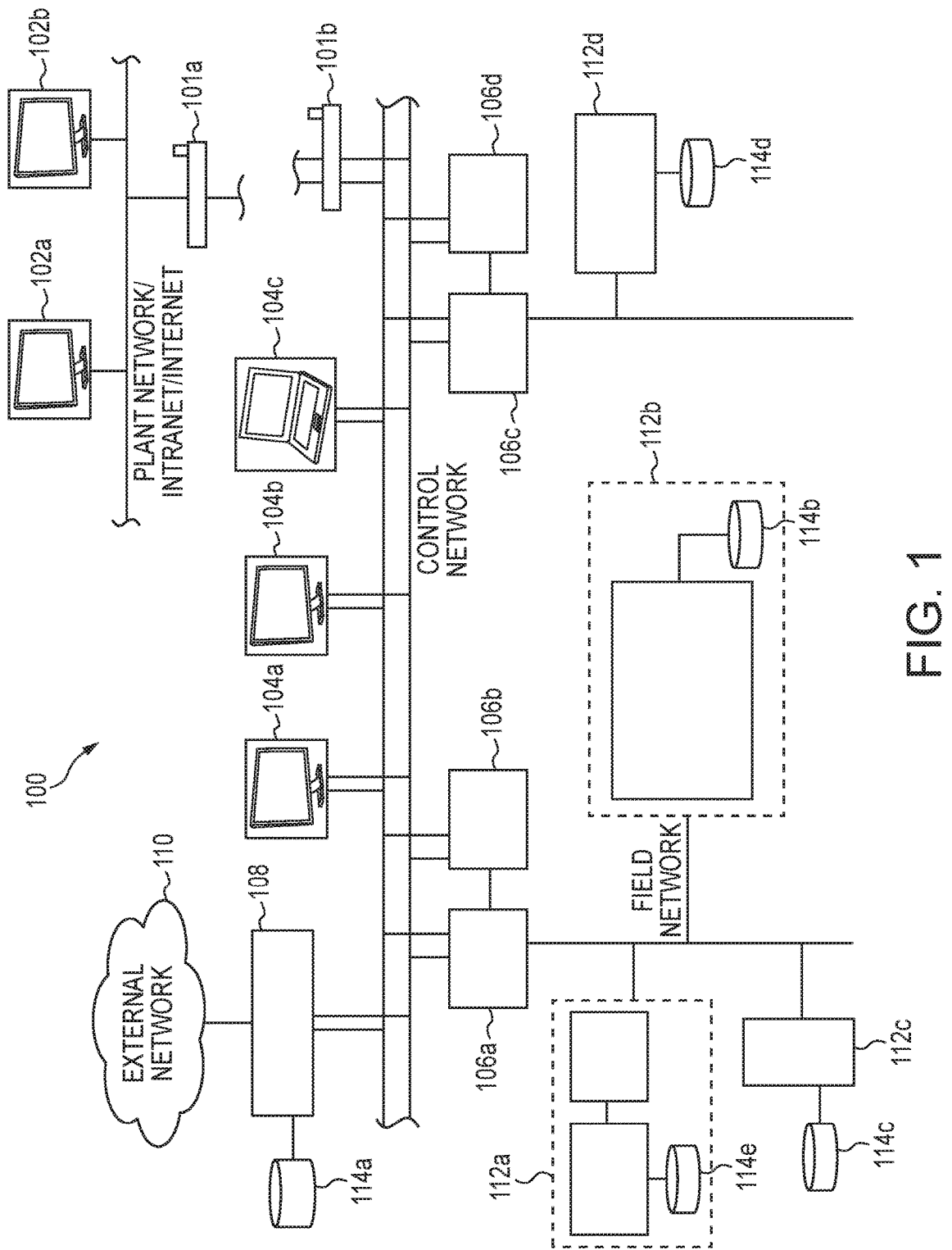
FIG. 1 illustrates an architecture of a Distributed Control System (DCS) of a process plant, in accordance with an embodiment of the invention.

Referring to FIG. 1, which illustrates an architecture 100 of a Distributed Control System (DCS) of a process plant, in accordance with an embodiment of the invention. The process plant may be one of, but not limited to, a paper plant, a chemical plant, a power plant, an oil rig, and a wind/solar power generation plant. In an embodiment, the process plant is a substation. In another embodiment, the process plant comprises a substation.

The process plant can have connectivity at one or more of, but not limited to, a component, a subsystem, a system and a network level. The connectivity can be enabled through one or more networks including, but not limited to, a plant network, a control network, a field network, and an external network (e.g. cloud, internet etc.). Further, each network may be connected to other networks via one or more routers such as 101a, and 101b.

Remote clients or computers such as 102a, and 102b, can be connected through the plant network/intranet/internet. The remote clients or computers can be used to perform one or more of, but not limited to, view trends and connect to the process plant. Workplaces such as 104a, 104b and 104c, can be used to perform one or more of, but not limited to, access process portals and engineering. One or more controllers such as, but not limited to, 106a, 106b, 106c and 106d, enable connection with the field network as illustrated in FIG. 1, for control of the devices connected thereto (e.g. field devices, process equipment, subsystems etc.).

The DCS can have one or more servers such as 108, for controlling various processes within the process plant. Further, the one or more servers may be accessible through one or more of a control network, a plant network, a field network and an external network 110 (e.g. cloud or internet). The one or more servers may also access the cloud or internet for providing different functionalities. The one or more servers can be, but need not be limited to, aspect servers, connectivity servers and application servers. The one or more servers are connected through the controllers and the one or more networks to a plurality of subsystems such as, but not limited to, 112a, 112b, 112c and 112d. Each subsystem can have one or more of, but not limited to, a field device and a process equipment. For example, subsystem 112a comprises a motor, while subsystem 112b comprises a generator. Taking another example, a subsystem can have two or multiple field devices.

The DCS also has a plurality of databases such as, but not limited to, 114a, 114b, 114c, 114d and 114e, distributed within the process plant. The databases may be embedded within a device or connected locally with a device.

Each database of the plurality of databases comprises information corresponding to at least one subsystem of the plurality of subsystems. A database of the plurality of databases can store information corresponding to one field device, one process equipment, one subsystem, multiple field devices, multiple process equipments, multiple subsystems or combinations thereof. For example, database 114e comprises information corresponding to the motor/controller of subsystem 112a. Taking another example, database 114a can have information received from different subsystems or other components of the process plant.

The information corresponding to a subsystem of the plurality of subsystems is at least one of a state information, a technical specification information and a measurement information with at least one of a field device and a process equipment of the subsystem.

The state information provides details about operational status of a field device, a process equipment, a subsystem or combinations thereof, at different instants of time. For example, the state information can indicate health, load, live/active etc. Further, the status can be tracked continuously or periodically or upon occurrence of certain events.

The technical specification information describes the characteristics of a field device, a process equipment, a subsystem or combinations thereof, as designed or produced. For example, the technical specification information can have details about the make, material, manufacturer, date of manufacture, date of commissioning, service requirements and so forth.

The measurement information with at least one of a field device and a process equipment is the information about a measurement performed/received at one of the field device or the process equipment. For example, a temperature sensor can record temperature data and pass it on to a controller or other equipment, which can store it in a corresponding database. The measurement may be related to a process, and accordingly may have details associated with one or more process parameters. The measurements performed by various field devices, equipments, subsystems or combinations thereof, may be consolidated at a central database. For example, database 114a can be a master database like a plant historian, which may consolidate or aggregate or track information in the plurality of databases.

The embodiment illustrated in FIG. 1, shows the architecture in the context of one process plant. The invention however, is not restricted to this embodiment. In accordance with an embodiment, multiple process plants can be connected/managed over a network such as, cloud or internet. Here, the plurality of databases may be distributed across one or more of, but not limited to, the multiple plants, cloud and enterprises. In another embodiment, the information corresponding to a subsystem(s) and/or a process plant may be stored in a cloud or in an enterprise, thereby enabling analytics at a cloud or enterprise level. Cloud and/or enterprise may contain information that is not device specific (e.g. time of the year that may indicate higher consumption or power surges due summer or festivities), that may be obtained based on analysis of data or through other sources. Such additional information can enable other analytics.

Figure 2:
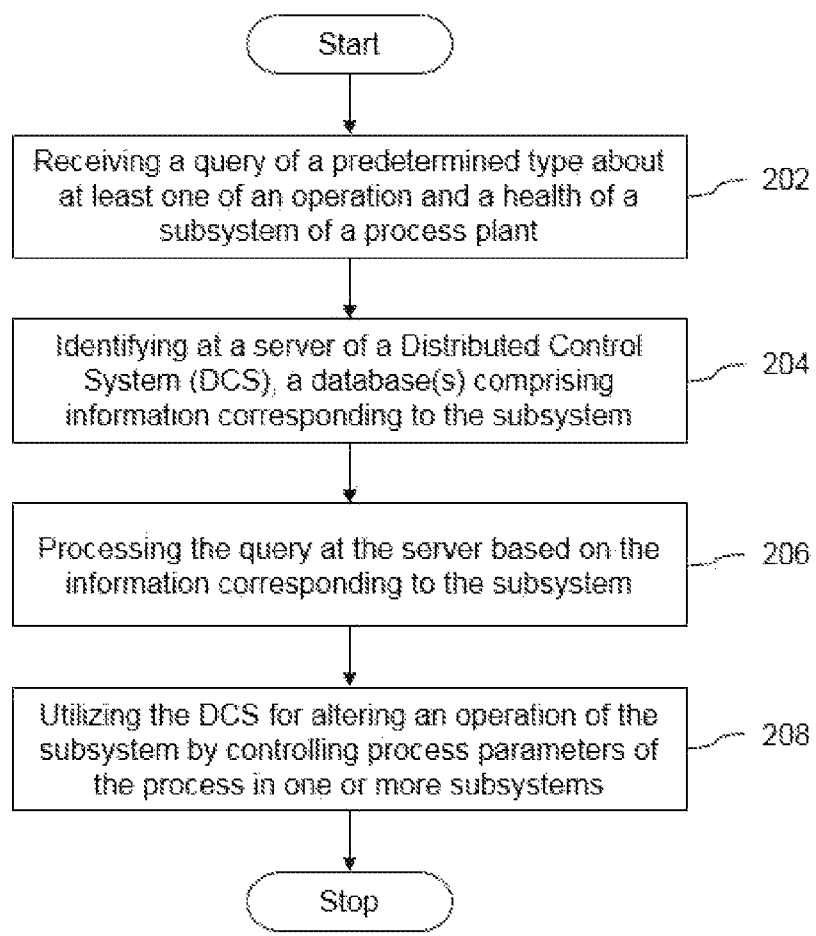
FIG. 2 is a flowchart of a method for managing a plurality of subsystems of the process plant, in accordance with an embodiment of the invention.

Moving now to FIG. 2, which is a flowchart of a method for managing the plurality of subsystems of the process plant, in accordance with an embodiment of the invention. The plurality of the subsystems are managed by controlling process parameters of a process in the process plant.

At 202, a query is received at the DCS. The query can be received at a human machine interface of the DCS. For example, the query may be issued using a remote client or a workplace or over the internet/cloud. In accordance with the embodiment, the query is of a predetermined type. For instance, the query can be of a type such as, predict, aggregate, fetch, classify, and so forth. Further, the query is associated with at least one of an operation and a health of a subsystem of the process plant. For example, the query can be associated with, but not limited to, a measurement, a communication, a distribution and a recording, performed/controlled/received by a subsystem. Taking another example, the query can be associated with a health metric such as, but not limited to, a battery level, a failure metric, and a process productivity.

The query is read and parsed at a server of the DCS. At 204, the server identifies a database(s) of the plurality of databases comprising information corresponding to the subsystem for which the query has been issued. For example, if the query is related to an operation of the motor of subsystem 112a, the server can identify the database as 114e. Taking another example, the server can identify a collection of databases comprising the requisite information for processing of the query. The database is identified based on the query. For example, the server may analyse the query to determine the database that stores the requisite information. Taking another example, the information source may be specified in the query itself (like substation identifier, equipment identifier etc.). The query may be routed to a database(s) of the plurality of databases for processing, after the identification.

Thereafter, at 206, the server processes the query based on the information corresponding to the subsystem available in the database. The query may be processed at the server or at the database. The step of processing has been described in detail in conjunction with the description of FIG. 3.

According to the processing, the DCS is utilized for controlling an operation of the subsystem at 208. The operation is controlled by controlling process parameters of the process in one or more subsystems of the plurality of subsystems. For example, the process may be stopped in one subsystem and started on another subsystem(s). Taking another example, a part of the process may be migrated from one to another or multiple subsystems.

In an embodiment, controlling the operation of a subsystem comprises at least one of servicing the subsystem and replacing at least one of the field device and the process equipment of the subsystem. For example, it may be determined that a field device is malfunctioning and needs replacement. Taking another example, it may be determined that a generator is due for or is going to be due for service.

Figure 3:
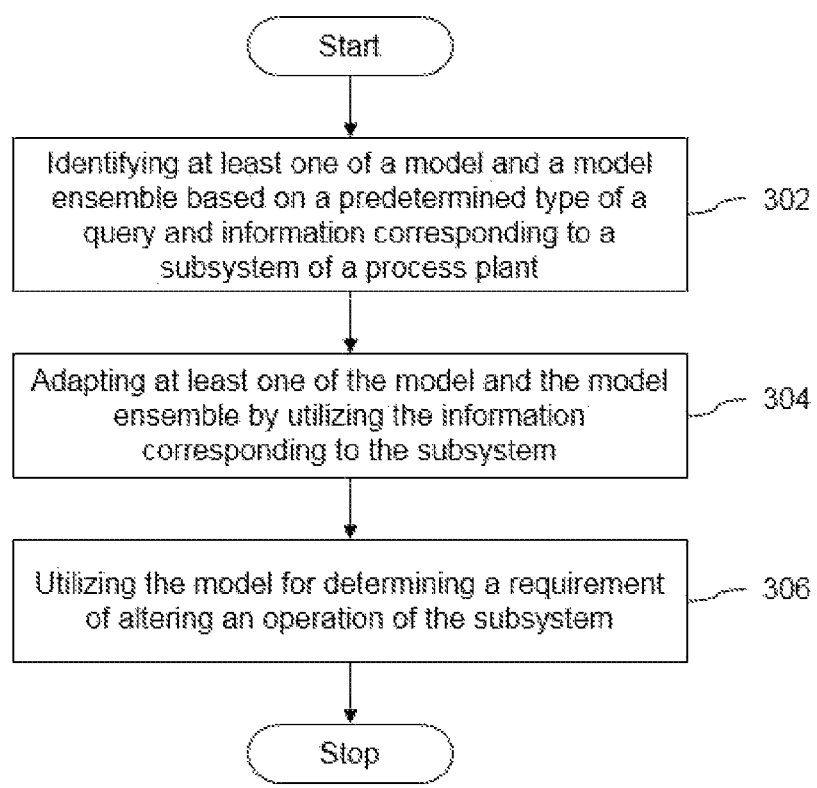
FIG. 3 is a flowchart of a step of processing a query, in accordance with an embodiment of the invention.

Referring now to FIG. 3, which is a flowchart illustrating the step of processing the query. At 302, at least one of a model and a model ensemble is identified for processing the query. At least one of the model and the model ensemble is identified based on the predetermined type of the query and the information corresponding to the subsystem.

The model is identified from a database of the plurality of databases. For example, database 114a can store a plurality of models and model ensembles. These models or model ensembles may be built for various types of queries and data. Accordingly, which model or model ensemble is applicable can be selected based on the type of query and the nature of data of the subsystem.

The step of identifying at least one of the model and the model ensemble can comprise generating metadata about the information of the subsystem in the database. For example, based on the type of query and nature of information stored in the database, metadata such as, but not limited to, number of features, data points etc. can be generated. The type of query may be inferred by the server to generate the metadata. For example, the type of target value such as real or discrete may be used for generating the metadata. At least one of the model and the model ensemble identified from the database is adapted at 304. The adaptation is performed using the information corresponding to the subsystem stored in the database.

In an embodiment, at least one of the model and the model ensemble is adapted by utilizing at least one part of the information corresponding to the subsystem for training and at least one other part of the information corresponding to the subsystem for testing the model.

Training at least one of the model and the model ensemble may involve generating templates for computation for an identified model. The generated model template may then populated by processing the query. Thereafter, at least one of the model and the model ensemble may be optimized till it has a high accuracy. Subsequently, the results may be evaluated after retrieving the test data.

In an embodiment, training itself comprises a step of evaluation, wherein at least a portion of the at least one part of the information is reserved for the evaluation. In other words, from the information reserved for training, one portion is reserved for training and another portion is reserved for evaluation of the trained model or the trained model ensemble. Here, the information used for the evaluation is different from that kept reserved for testing (i.e. the at least one other part of the information).

Testing may involve determining one or more metrics for the trained model or model ensemble and comparing those metrics against a benchmark. For example, in case of a prediction model, the query may be allowed for processing only if the prediction score is acceptable (i.e. above a set limit). Otherwise, the steps may be repeated to select/train a better model or model ensemble from the database.

Adapting at least one of the model and the model ensemble may also involve adjusting at least one of the model and the model ensemble for processing the query. At least one of the model and the model ensemble may be adjusted based on a determination of error in application of at least one of the model and the model ensemble on the information corresponding to the subsystem.

Consider a scenario, where the amount of data available for training/testing may not be sufficient or may be more than requisite. In such a scenario, there may be a case of over-fitting or under-fitting. In order to determine that the model or model ensemble is over-fit or under-fit, the information reserved for evaluation in training (described above) may be used. Accordingly, upon such a determination, the model or model ensemble may be adjusted for appropriate processing of the query.

Once the model or the model ensemble is adapted, at least one of the model and the model ensemble is utilized for controlling an operation of the subsystem at 306. For example, the model may be applied on a select set of data from the information stored in the database (such as on data collected at particular instants of time), to obtain certain results such as, determination of a possible fault at a future time, determination of a service requirement and so forth. The generation/application of the model, or processing of a query may involve importing the data from a database to a central or other database. Alternately, the query may be applied directly on a database with the data.

Once the model or model ensemble is applied, it may provide a result that a control in the operation of the subsystem is required. The operation may be controller by the DCS by either migrating the operation from the subsystem to another subsystem (or subsystems), or a portion of the operation may be migrated to other subsystems. Other controls can include, but need not be limited to, temporarily pausing an operation, and changing parameters associated with the operation.

While the method has been described in conjunction with one process plant, the method is not restricted to this embodiment, and can be easily extended to a multiple plant system/environment.

Various steps of the method described above can be implemented by one or more modules. The one or more modules may be provided on the server of the DCS. Alternately, the modules can be distributed within the process plant. For example, the modules may be deployed inside each database of the plurality of databases. In such a case, each server can run a service that helps routing a query to an appropriate database for processing.

Figure 4:
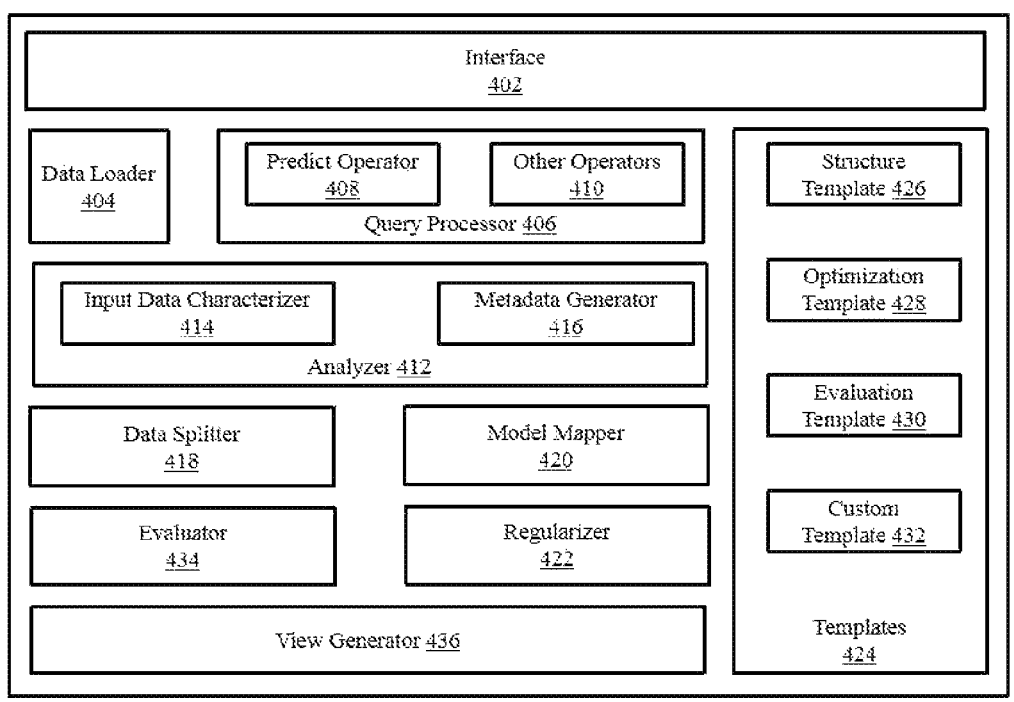
FIG. 4 illustrates a block diagram of a set of modules for processing the query, in accordance with an embodiment of the invention.

The steps may be implemented by one or more modules illustrated in FIG. 4, in accordance with an embodiment. Here, an interface 402 is provided for reading queries. A data loader 404 provides a data import facility (e.g. for importing data from one database into another (or central) database). A query processor 406 processes the query. Depending on the type, a suitable processing may be performed. For example, a predict operator 408 may be used for a prediction query, while other operators 410 may be used for other type of queries.

An analyzer 412 characterizes the nature of data and query processing (e.g. prediction). An input data characterizer 414 of analyzer 412 may characterize the query (e.g., into classification or regression query). The component identifies the type of the target attribute (real values/discrete values) to infer the type of query.

A metadata generator 416 may generate relevant statistics about data (e.g. machine learning statistics). Analysis of basic statistics of the data helps to select models or model ensembles that suit the type of data (e.g. at step 302). For example, if the number of features is significantly larger than the number of data points, then regularizing (e.g. penalizing the model or model ensemble for fitting data too closely to the data on which the model is trained) the data may help to prevent over-fitting. Metadata generator 416 component may make these decisions autonomously.

A data splitter 418 creates training and test tables, and splits data into training and test datasets. The data may be split randomly for training/testing. A model mapper 420 maps a query to a model. Once a query is characterized, model mapper 420 maps the query to a model suitable for processing the query. Model mapper 420 may use various models or model ensembles (stored in the database) such as, but not limited to, linear and non-linear transformed models for regression, or other models for classification. Model mapper 420 can pick a model or model ensemble and generate templates to compute the values of the model parameters. The model or model ensemble may be picked for processing of the query at 206.

Figure 5:
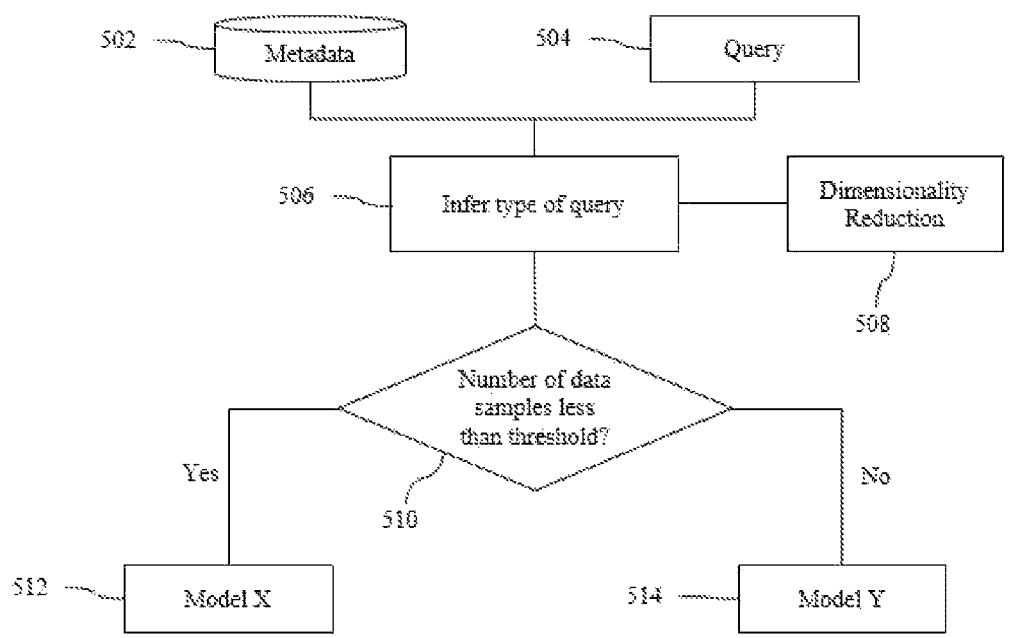
FIG. 5 illustrates a flowchart of a step of selecting a model, in accordance with an embodiment of the invention.

The flowchart in FIG. 5 illustrates an example of how model mapper 420 chooses models/model ensembles. In the example of FIG. 5, model mapper 420 takes metadata 502 and query 504 as input to infer the type of query at 506. Depending on the type of query, dimensionality reduction may be performed at 508, before progressing to other steps. Dimensionality reduction may provide a simpler feature-set that captures most of the variability in the system, thereby leading to a simpler model.

Thereafter, at 510, model mapper 420 may check for the number of data samples available for processing the query at 512. Depending on the number of data samples available, a suitable model may be chosen. For example, if a threshold of 100,000 data samples is set, and the number of data samples is less than 100,000, then model X (514) may be chose. Otherwise, model Y may be chosen. Model X may be a linear classifier, while model Y may be a Stochastic Gradient Descent (SGD) classifier, if the query is of a prediction type. Other examples of models that may be chosen include, but are not limited to, ridge regression, SGD regression, Lasso, Support-Vector Machines, Neural-nets, Naive Bayes, kernel approximation, K-means, and decision trees.

Model mapper 420 may also train the model or model ensemble selected using the information available in the database (e.g. at step 304). For example, a model may be used to predict a value that would classify a transformer as faulty or not-faulty. The determination may be based on whether the predicted value is above or below a threshold. In order to do so, the model is trained to learn the model over a part of data that is split into a training dataset. The predicted value may be a function of peak load at a particular time of the year, power quality and maintenance history.

A model or model ensemble selected by model mapper 420 may have to be adapted/regularized (e.g. at 304). A regularizer 422 checks, corrects and/or prevents over-fitting, under-fitting or other training errors of models or model ensembles.

While generating/adapting a model or model ensemble, various templates may be created. Templates 424 may be used to create and populate templates for model generation/adaptation. Examples of such templates include a structure template 426, an optimization template 428, and an evaluation template 430. Structure template 426 could provide the basic structure of the model. For example, if it a regression model, then what are the parameters, functions etc. for regression can be specified by the model. Similarly, optimization and evaluation templates can provide alternatives for optimization and/or evaluation of the model. For example, an optimization template can be to minimize cost or time. Similarly, an evaluation template can be to check the sufficiency of the data used for training the model.

Templates 424 may also be used to run a query, and evaluate the result after retrieving the test data. A custom template 432 may also be generated using templates 424. An evaluator 434 re-routes a query for evaluation with other models till a satisfactory model is found. A view generator 436 creates and materializes views (e.g. virtual tables). The views may be for frequent queries. Alternately, the view(s) may be for a current query. The view may show a comparison of the current result with previous results. The result may be used as an input for the DCS. There may be a step of approving application of the result that may be performed by an administrator. For example, if the result of a query is that a field device should be restarted, which could add a delay of five minutes, a notification may be provided to the administrator. Based on the notification, the administrator may approve/deny the restart. The DCS may accordingly continue operation or restart the field device.

The method described herein has a wide variety of applications. For example, the method may be used to monitor electric load and outages. Here, queries related to the load and outage trend may be run and the result extrapolated to obtain a trend for predicting electric power trips. For example, a forward-looking query issued can be:
PREDICT outages
FROM SubstationX The query result may indicate that there may be a major black-out, and a feeder line may become isolated. This may require other feeder lines to take up the load.

When the other feeder-lines take up the load where a line may trip, it may increase the chances of electrical overload and damage to the electric lines (metal joins etc. heating-up and lines may sag) and other components such as transformers. In such a case, further analysis may be called for and a system analyst may opt for a drilled-down analysis of a possible trip.

Subsequently, drill-down queries may be issued at databases in the grid (e.g. at the substation or embedded databases at transformers/circuit-breakers etc.), to get raw data that could be further analyzed for the reason behind a possible trip. For example, the following query may be run:
PREDICT Feeder_characteristics
FROM SubstationX
WHERE Feeder_id='SPECIFIC IDs to be drilled-down'

Similarly, queries may be issued to transformer databases that are related to the drill-down feeder-lines to get characteristics such as:
PREDICT transformer_fault
FROM Transformer_DB
WHERE Feeder_id='SPECIFC IDs of associated feeder-lines'

The prediction of transformer fault may be based on various features such as: electrical load, power quality, manufacturer, age, and maintenance history of the transformer, which are used to train a prediction model for transformer faults. This query may be routed to the respective data source (i.e., transformer in this case).

Consider a plant that manufactures automobile panels and uses equipment such as hydraulic press. Such a plant may face equipment failures such as press-failure. This failure may be due to various reasons such as oil pressure or temperature may have become too high and may have damaged the press. This could be monitored by using the method described herein. A condition monitoring query can be issued. Here, parameters such as oil pressure, oil temperature, oil viscosity and oil leakage, and air pressure may be analyzed to predict probability of equipment failure. A model may be used for the prediction. For example, a model such as stochastic gradient descent may be used to maximize the likelihood of classifying an equipment into 'may fail' and 'may not fail' category with different probabilities using logistic regression.

Furthermore, with a networked querying and distributed analytics infrastructure, a drill-down query may be issued to an embedded database on an equipment (such as the press). This query may establish failure probability of the machine based on the real time operational parameters. It may also estimate the time to fail in correlation with the probability of machine failure.

The method and system described herein provide several advantages. The system extends the ability of plant databases for supporting various types of queries. The method enables directly performing analytics over a wide variety of plant data, and utilizing the result to control state/health of various subsystems in the plant or in a network of plants. In addition, drill-down analysis can be performed and actions taken automatically, in case there is a state/health change required/identified. By eliminating dependence on technician, and enabling automated analysis over a highly distributed data, there is a high accuracy in problem determination and solving.

It would be apparent that the invention is not restricted to the embodiments/examples disclosed herein or shown in the drawings/the advantages listed above. It will be appreciated by those skilled in the art that the present invention can be embodied in other specific forms without departing from the spirit or essential characteristics thereof. The presently disclosed exemplary embodiments are therefore considered in all respects to be illustrative and not restrictive. The scope of the invention is indicated by the appended claims rather than the foregoing description and all changes that come within the meaning and range and equivalence thereof are intended to be embraced therein.

The invention claimed is:

1. A method for managing a plurality of subsystems of a process plant by controlling process parameters of a process in the process plant, wherein each subsystem of the plurality of subsystems comprises at least one of a field device and a process equipment, wherein the process plant is controlled using a Distributed Control System (DCS) with a plurality of databases distributed within the process plant, wherein each database of the plurality of databases comprises information corresponding to at least one subsystem of the plurality of subsystems, wherein the information corresponding to the at least one subsystem of the plurality of subsystems is at least one of state information, technical specification information, and measurement information associated with the at least one of the field device and the process equipment of the at least one subsystem, the method comprising:
receiving a query of a predetermined type at a human machine interface of the DCS, wherein the query is associated with at least one of an operation and a health of a select subsystem of the plurality of subsystems, and wherein the predetermined type is at least one of predict, aggregate, fetch, classify, and regress;
identifying, at a server of the DCS, one or more databases comprising information corresponding to the select subsystem associated with the query, wherein the one or more databases are identified from the plurality of databases based on the query;
processing the query, at the server, based on the information corresponding to the select subsystem available on the one or more identified databases, wherein processing the query comprises: (i) identifying, from a database of the one or more identified databases comprising a plurality of models and model ensembles, at least one of a model and a model ensemble for processing the query, wherein the at least one of the model and the model ensemble is identified based on the predetermined type of the query, and wherein the at least one of the model and the model ensemble fits the information corresponding to the select subsystem; and (ii) adapting the identified at least one of the model and the model ensemble by utilizing the information corresponding to the select subsystem; and
utilizing the identified at least one of the model and the model ensemble in the DCS to control the operation of the select subsystem by controlling process parameters of the process based on said processing of the query.

2. The method of claim 1, wherein adapting the identified at least one of the model and the model ensemble comprises utilizing at least one part of the information corresponding to the select subsystem for training the identified at least one of the model and the model ensemble and at least one other part of the information corresponding to the select subsystem for testing the identified at least one of the model and the model ensemble.

3. The method of claim 2, wherein training comprises a step of evaluation, wherein a portion of the at least one part of the information corresponding to the select subsystem is reserved for the evaluation.

4. The method of claim 1, wherein adapting the identified at least one of the model and the model ensemble comprises determining an error in application of the identified at least one of the model and the model ensemble based on the information corresponding to the select subsystem.

5. The method of claim 1, wherein controlling the operation of the select subsystem comprises at least one of servicing the select subsystem and replacing at least one of the field device and the process equipment of the select subsystem.

6. The method of claim 1, wherein the process plant is a substation.

7. The method of claim 1, wherein the process plant comprises a substation.

* * * * *